Figure 1:
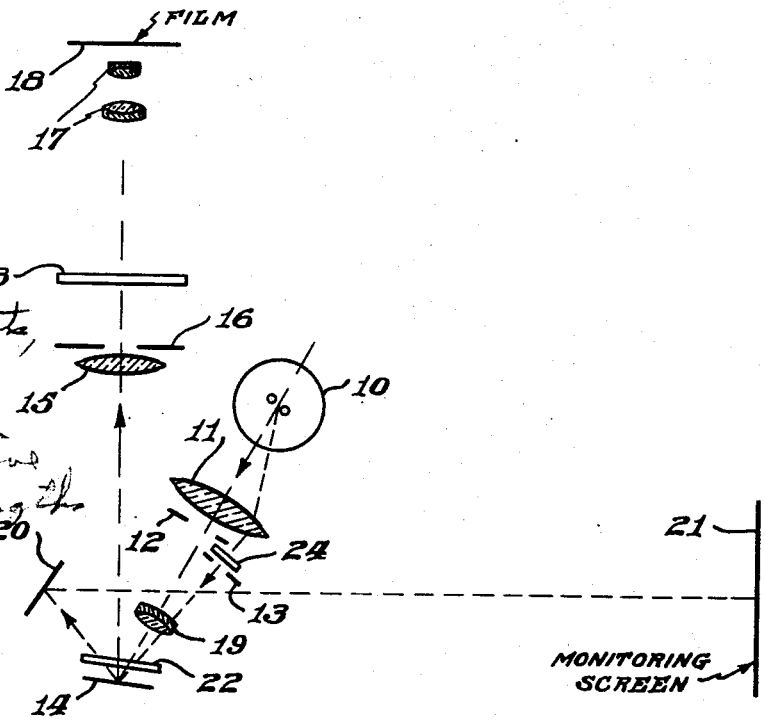

Oct. 17, 1944.  G. L. DIMMICK  2,360,403
OPTICAL SYSTEM
Filed Dec. 19, 1940  2 Sheets-Sheet 1

*Lens with filter and coated elements, the coating of which is is transmissive of reflected wavelengths of light.*

Inventor
Glenn L. Dimmick
By J. J. Luff
Attorney

Oct. 17, 1944.    G. L. DIMMICK    2,360,403
OPTICAL SYSTEM
Filed Dec. 19, 1940    2 Sheets-Sheet 2

Inventor
Glenn L. Dimmick
By J. J. Huff
Attorney

Patented Oct. 17, 1944

2,360,403

UNITED STATES PATENT OFFICE 2,360,403

OPTICAL SYSTEM

Glenn L. Dimmick, Haddonfield, N. J., assignor to Radio Corporation of America, a corporation of Delaware Application December 19, 1940, Serial No. 370,758

5 Claims. (Cl. 88—1)

This invention relates to improved optical systems such as are suitable for use in the photographic recording or reproduction of sound and more particularly to a highly efficient optical system having selective transmission characteristics. It has been proposed to provide a sound-recording optical system which transmits ultra violet light to the photographic record or includes a color filter adapted to selectively to transmit the light rays for which the photocell is the most sensitive.

It has also been proposed by K. E. Blodgett in Patent 2,220,861 to increase the efficiency of light-transmitting surfaces by coating them with a layer which is constituted of an alkali earth salt of a fatty acid applied in monomolecular layers and is of a thickness equal to an odd number of quarter wave lengths of the light to be transmitted. A modification of this idea has been suggested by Cartwright and Turner in U. S. Patent No. 2,207,656, who propose to evaporate onto the light-transmitting surface a layer of calcium fluoride which is of a thickness equal to a quarter wave length of the predominantly transmitted light. The foregoing suggestions have involved practical difficulty for the reason that the applied films were so thin and fragile as to be readily damaged or even wiped off and further they did not provide a selective high transmission. In each of the above patents it is pointed out that the index of refraction of the coating material should approach the square root of that of glass.

An improved coating is described in U. S. Patent No. 2,338,233, granted January 4, 1944, on my application Serial No. 348,815, filed July 31, 1940, for "Reduction in reflection from transparent material." This is produced by evaporating a mixture of aluminum oxide and calcium fluoride onto the surface of the glass or other light-transmitting member. This material, through some kind of a reaction, either physical or chemical, produces a hard, tenacious homogeneous coating on the glass. This coating, however, when applied with the thickness of only a quarter wave length of the light to be transmitted is not particularly selective. If, however, the thickness of the coating is increased to an odd multiple of a quarter wave length, the selectivity thereof is increased while the efficiency of transmission for the selected wave length remains unaffected.

A sound-recording optical system of the galvanometer type usually has something of the order of 16 surfaces where reflection loss occurs and, with a loss of approximately 4 per cent of each surface, the total loss is of the order of 50 percent. Likewise, in a sound-reproducing system, there may be as many as eight glass-to-air surfaces resulting in a total loss of the order of 30 percent.

If selective transmission of such an optical system is secured by the insertion of an appropriate color screen, the overall transmission is correspondingly greatly reduced. If the lens surfaces are coated with a nonreflecting coating having a thickness of a quarter of a wave length, the general transmission of the system is greatly increased, but the filter thickness must be maintained high in order to transmit only the desired frequency band.

I have discovered that, if the several light-transmitting surfaces of such an optical system are coated with a layer which is of material such as the calcium fluoride-aluminum oxide compound referred to above and has a thickness of an odd multiple of a quarter of a wave length for light of the particular frequency or wave length for which band pass characteristics are desired, the transmission may be greatly increased for the desired wave length while it is not appreciably increased for undesirable wave lengths and a correspondingly thinner selective filter may be used. thereby securing much higher transmissivity at the wave lengths desired. Even if the band pass filter be omitted, a selectivity of two-to-one in favor of the desired band of light waves may be secured by the selectively transmissive coating alone as compared with the uncoated optical system.

One object of the invention is to provide an improved optical system having light-selective characteristics.

Another object of the invention is to provide an improved optical system having a high transmission in a predetermined band of the spectrum and a low transmission in other portions of the spectrum.

Another object of the invention is to provide a photophonographic optical system which will have extremely high efficiency in a predetermined band of the spectrum only.

Figure 2:
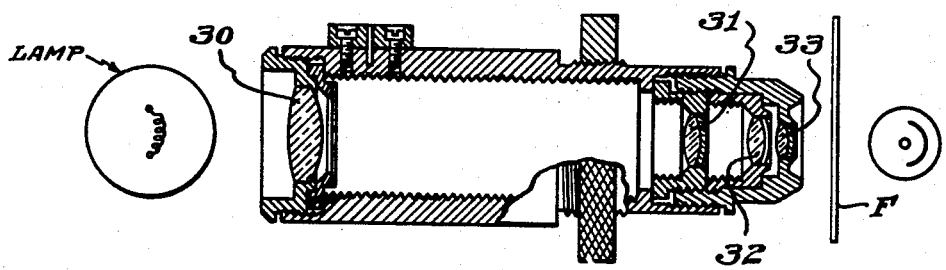
Figure 3:
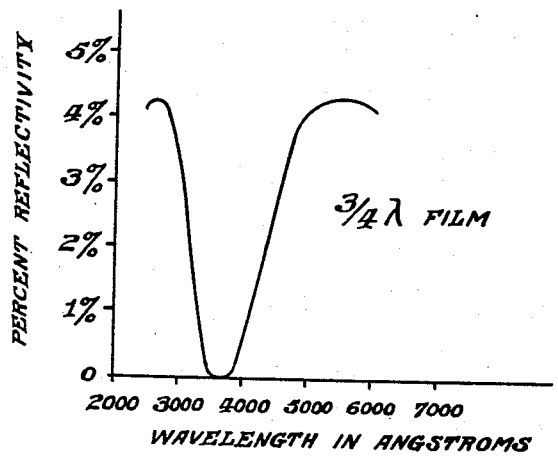
Figure 4:
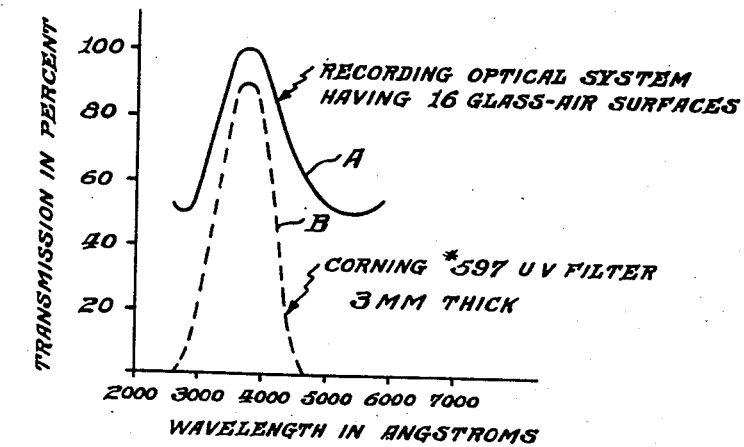
Figure 5:
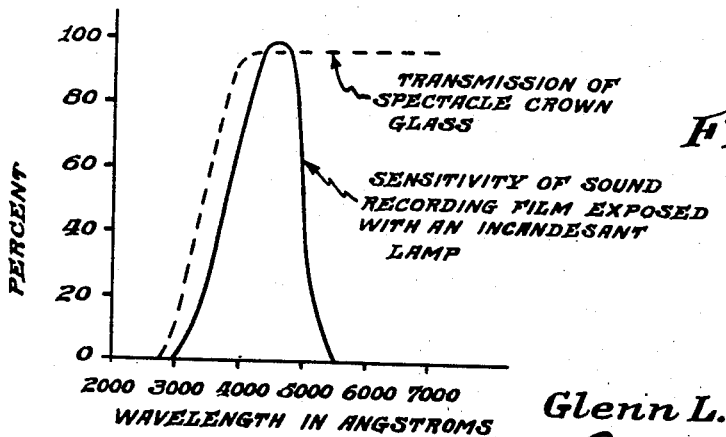

Other and incidental objects of the invention will be apparent to those skilled in the art from a reading of the following specification and an inspection of the accompanying drawings in which Figure 1 is a schematic plan view, partly in section, of a commercial type of sound-recording optical system illustrating the application of my invention, Figure 2 is a longitudinal sectional view of a commercial type of sound-reproducing optical system showing a different application of the invention, Figure 3 is a curve showing the selective transmissivity of a film of material having a thickness of three-quarters of a wave length, Figure 4 is a group of curves showing the improvement in light transmission of a recording optical system, such as shown in Figure 1, when the surfaces thereof are covered with a series of three-quarter wave length films and the transmission in the same wave band of a typical color filter used in such a system, and Figure 5 illustrates the transmission of the lenses of the optical system and the sensitivity of the film used with a recording optical system, such as shown in Figure 1.

In the recording system of Figure 1, light from the exciter lamp 10 passes through the condenser lens 11 and the aperture plate 12 to the lens 19 from which the light is directed through the cover plate 22 on to the galvanometer mirror 14. Light which passes through the auxiliary aperture in the plate 13 and the filter 24 follows the same path but is reflected to the auxiliary mirror 20 and on to the monitoring screen 21. The light filter 24 serves to pass only visible nonactinic light and thereby prevents stray actinic light from the monitoring beam from affecting the image. Light of the main recording beam which is reflected from the galvanometer mirror 14 passes again through the cover plate 22 and the lens 15 to the slit plate 16, an image of the aperture plate being formed on the slit plate 16 by the lenses 19 and 15. After passing through the slit in the plate 16, the light passes through the color filter 23 which may be, for example, a layer of Corning No. 597 ultra violet filter glass three millimeters thick, and the image of the slit in the plate 16 in then focused on the film 18 by the objective 17 which is composed of two lenses. It will be apparent that, considering the two passages of the light through the cover plate 22, the light from the exciter lamp 10 passes through a total of sixteen surfaces after leaving the lamp envelope.

Since a coating of the material referred to above, and having a thickness of three-quarters of the wave length of the light which is to be transmitted by the system, produces a transmission characteristic for a single surface such as shown in Figure 3, where the surface reflection falls to zero for the desired band, and remains around four percent which is the normal reflection of an untreated surface, for the adjacent bands, then the total transmission for the optical system will be as indicated in the upper curve of Figure 4.

It will be apparent from an inspection of curve A of Figure 4 that the three-quarters wave length coating alone on the glass surfaces secures a band separation effect approximately half that which is secured by the color filter, the characteristics curve B of which is indicated in the dotted lines. If the color filter of full 3 mm. thickness is used in conjunction with an optical system having the surfaces thus coated, then these two curves are multiplied by each other to derive the total transmission of the system. In this case, the maximum transmission of the system at the selected wave length is substantially the maximum transmission of the filter, while the selectivity of the system is improved over that secured by the filter alone. Otherwise stated, the resulting band width is narrower than in the case of the filter alone. If a still higher transmission is desired and the selectivity of the filter alone is adequate, then a considerably thinner filter may be used in order to secure the previous selectivity and at the same time secure higher transmission.

The utility of the optical system with treated surfaces without the filter is illustrated in Figure 5. The dotted curve in this case shows the transmission of glass used in the optical system which, it will be apparent, is negligible at a wave length less than about 2800 Angstrom units. From Figure 4, it will be apparent that the curve of transmission of the treated surfaces starts up again at a wave length of 2750 Angstrom units but, since the lens glass does not transmit beyond this point, this increased transmission is immaterial. Similarly, it will be seen that, on the long wave length side, the transmission of the nonreflecting coating starts up again at about 5500 Angstrom units, but, from the solid curve in Figure 5, it will be apparent that, at this wave length, the sensitivity of the sound-recording film has fallen substantially to zero at this wave length, and the increased transmission will, therefore, be immaterial. It will be apparent, from the product of the corresponding ordinates of the solid curve of Figure 4 and the curves of Figure 5, that an optical system constructed in accordance with the present invention and omitting the selective filter will produce as good results from the standpoint of selectivity as has heretofore been accomplished by such a system including uncoated lens surfaces and a selective filter and, at the same time, the optical efficiency of the system will be more than twice as great as such a system, while this improved optical system using a thinner filter than has heretofore been used will secure both greatly improved transmission and improved selectivity.

In the optical system shown in Figure 2, in which there are only eight glass-to-air surfaces, the normal transmission loss due to surface reflection will be of the order of 30 percent. If my improved lens coating is used, the thickness of the film should be chosen according to the type of photocell which is to be used. If the cell has its maximum sensitivity in the blue, then the transmission should be rendered a maximum in that region, while, if the red sensitive type of cell is used, it should correspondingly be made a maximum in that region. With this arrangement, since the surface reflection amounts to only a third of the total available light, the improvement in transmission can only be approximately 50 percent as compared with an improvement of approximately 100 percent in the recording optical system.

It will be apparent to those skilled in the art that the application of this invention is not limited to sound recording and reproducing optical systems, but it may be applied to any type of optical system in which a color selective characteristic is desired.

In the performance of this invention, the lenses used should be corrected for the particular wave length for which the transmission is to be a maximum as the proper coordination of lens correction, surface transmission and color filter transmission greatly enhances the accuracy of image production.

My invention is not limited to the use of a coating having a thickness of three-quarters of a wave length, but greater odd numbers of quarter wave lengths may be used as five-quarters, seven-quarters, etc. However, as the thickness of the layer increases beyond five-quarters, it becomes increasingly more difficult to apply and, in a complex optical system such as those described, the selectivity at three-quarters is adequate, while at five-quarters the selectivity may be increased to such an extent as to materially decrease the overall transmission, and this effect increases to an undesirable extent with thicknesses beyond seven-quarters.

I claim as my invention:

1. An optical system including a plurality of light-transmissive elements, a color filter transmissive of a particular band of light only, and transparent coatings having an index of refraction approaching the square root of that of glass on the surfaces of said transmissive elements, the coatings having a thickness of an odd plurality of quarter wave lengths of the light transmitted by said filter, and being the evaporation product of a mixture of calcium fluoride and aluminum oxide.

2. A sound-recording optical system including a plurality of light-transmissive elements, a color filter transmissive of a particular band of light only to which the recording film is sensitive, and transparent coatings on the surface of said transmissive elements the said coatings having an index of refraction approaching the square root of that of glass and having a thickness of an odd plurality of quarter wave lengths of the light predominantly transmitted by said filter, and being the evaporation product of a mixture of calcium fluoride and aluminum oxide.

3. An optical system including a plurality of light-transmissive elements, and a transparent coating on each of the outer surfaces of said transmissive elements, said coatings having a thickness of an odd plurality of quarter wave lengths of the light which is to be predominantly transmitted by said system, and being the evaporation product of a mixture of calcium fluoride and aluminum oxide.

4. An optical system including a plurality of light-transmissive elements, a color filter predominantly transmissive of a particular band of light only, and transparent coating having an index of refraction approaching the square root of that of glass on the surfaces of said transmissive elements, the coatings having a thickness of an odd plurality of quarter wave lengths of the light transmitted by said filter, and the filter being of such thickness as to be supplemental in its selective transmission to the selective transmission of said coatings.

5. A sound-recording optical system including a plurality of light-transmissive elements, a color filter predominantly transmissive of a particular band of light only to which the recording film is sensitive, the transparent coatings on the surface of said transmissive elements the said coatings having an index of refraction approaching the square root of that of glass and having a thickness of an odd plurality of quarter wave lengths of the light predominantly transmitted by said filter, and the filter being of such thickness as to be supplemental in its selective transmission to the selective transmission of said coatings.

GLENN L. DIMMICK.